Oct. 19, 1937.      J. J. KUHN ET AL      2,096,046
SUPPORT FOR TELEPHONES
Filed March 27, 1935      5 Sheets-Sheet 1
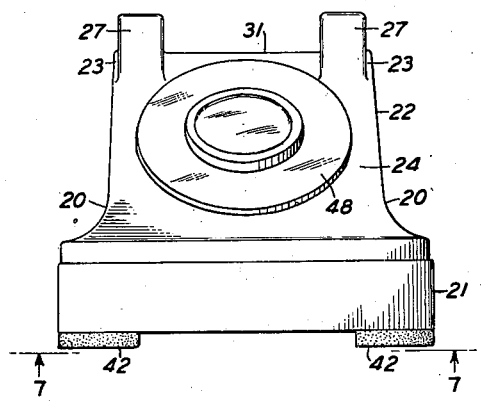
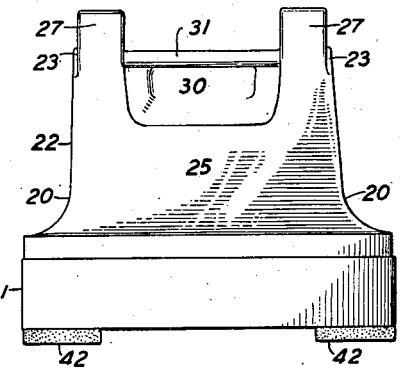
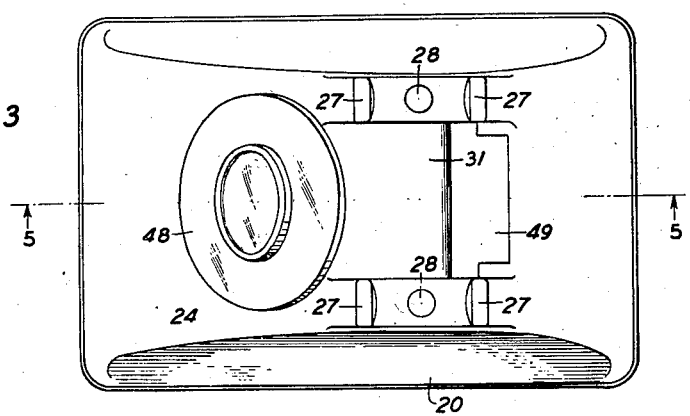
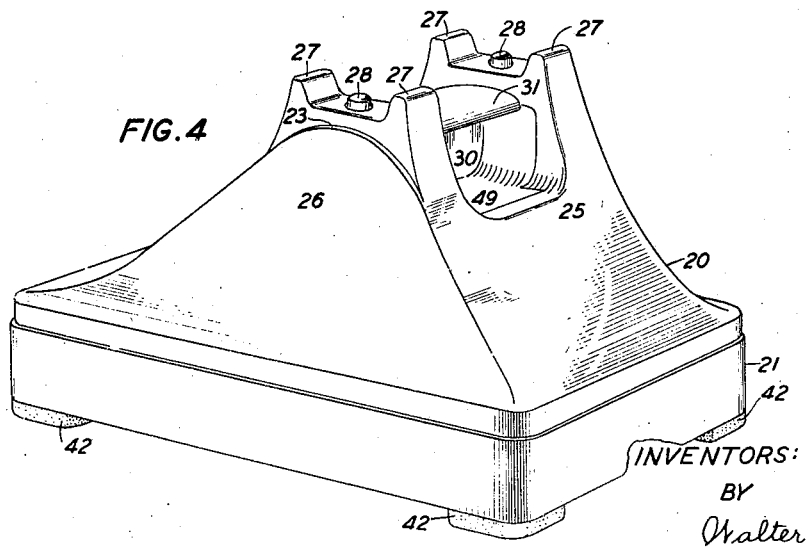
INVENTORS: J.J. KUHN
G.R. LUM
BY
Walter C. Kiesel
ATTORNEY

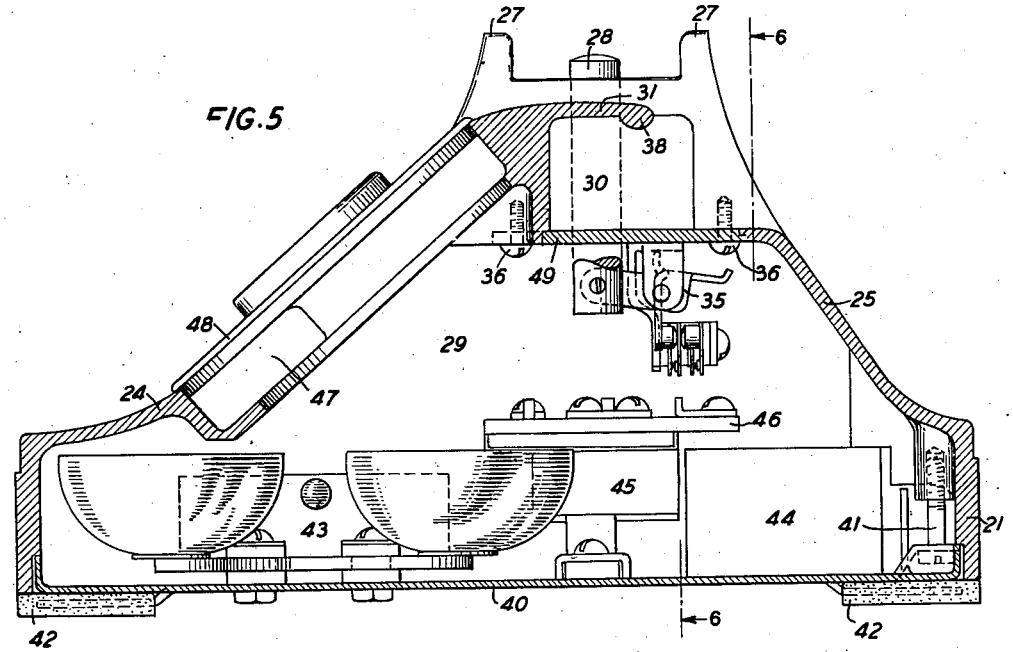
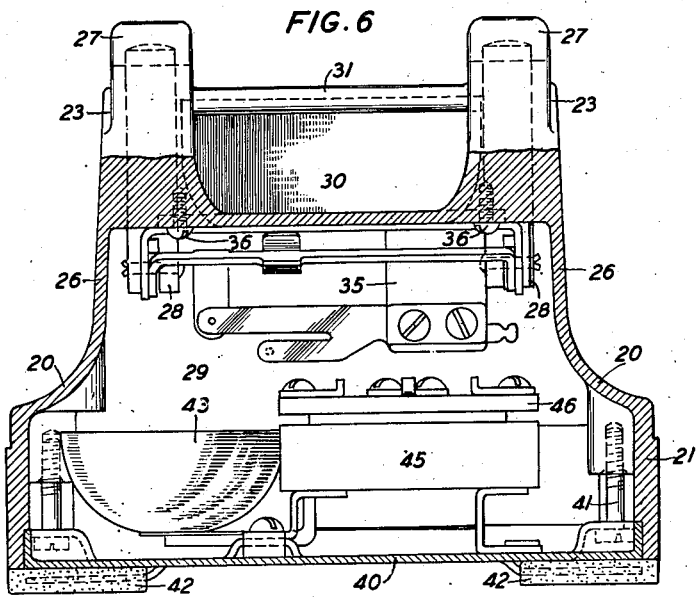

Oct. 19, 1937.   J. J. KUHN ET AL   2,096,046
SUPPORT FOR TELEPHONES
Filed March 27, 1935   5 Sheets-Sheet 3
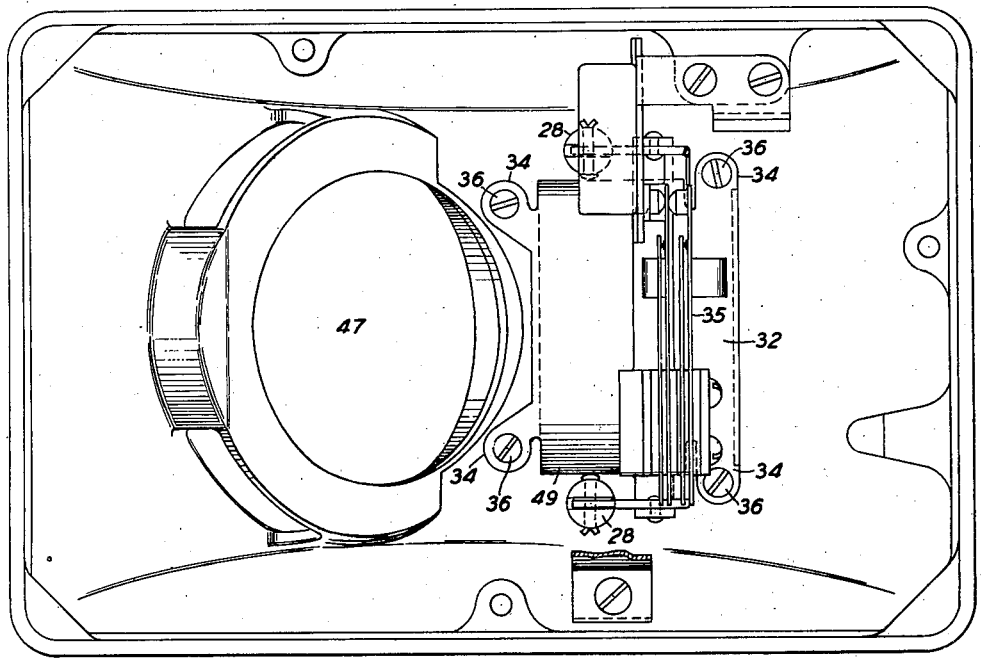
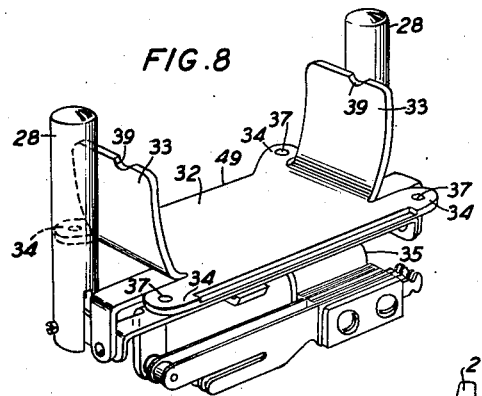
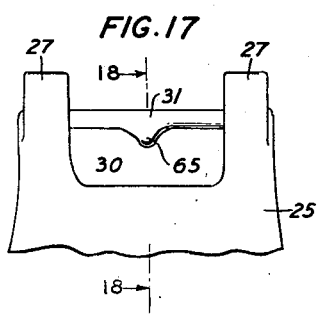
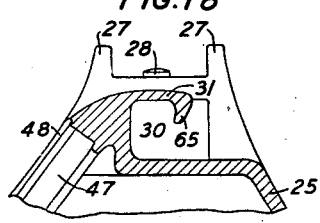
INVENTORS: J. J. KUHN
G. R. LUM
BY
Walter C. Kiesel
ATTORNEY

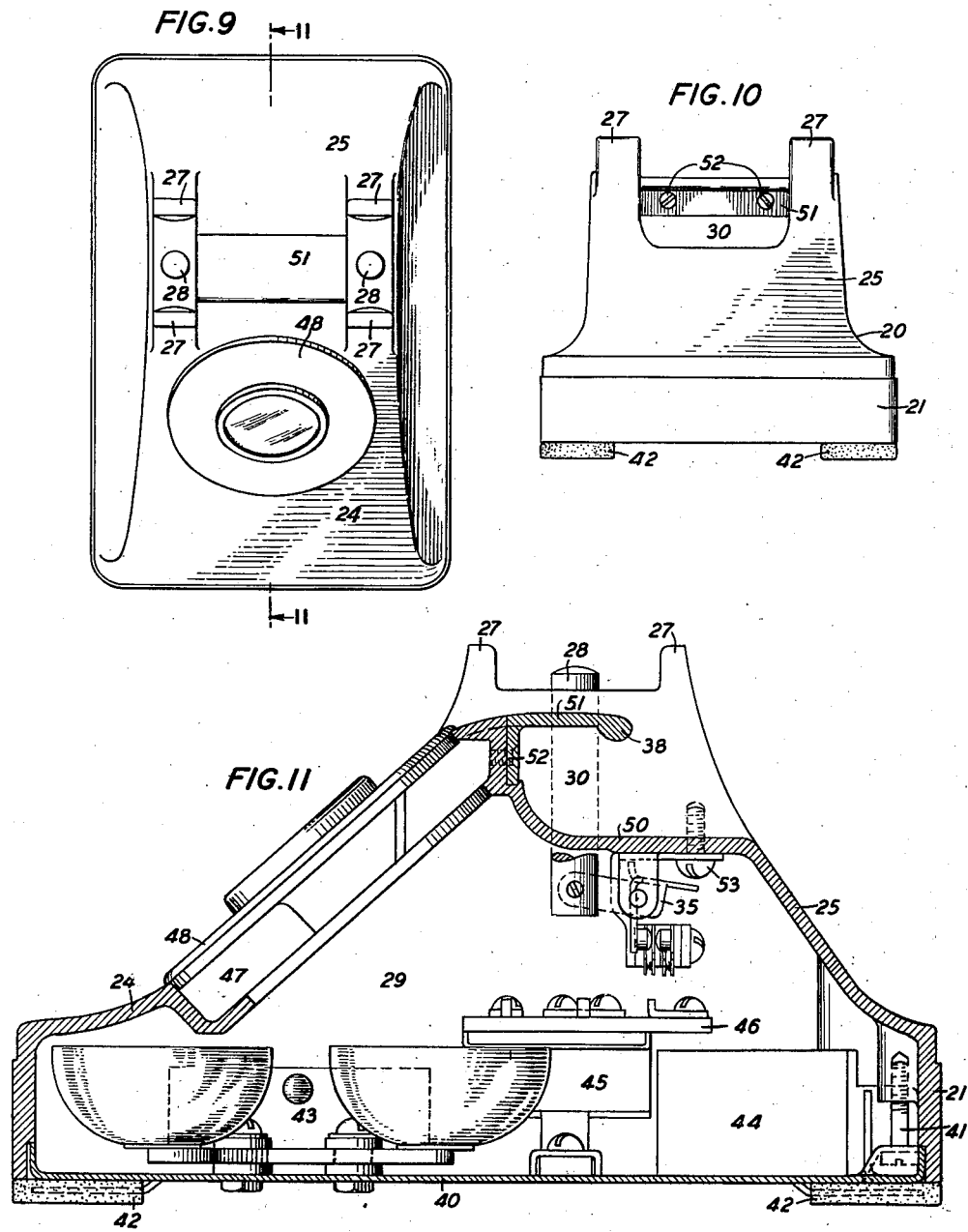

Oct. 19, 1937.  J. J. KUHN ET AL  2,096,046
SUPPORT FOR TELEPHONES
Filed March 27, 1935  5 Sheets—Sheet 5
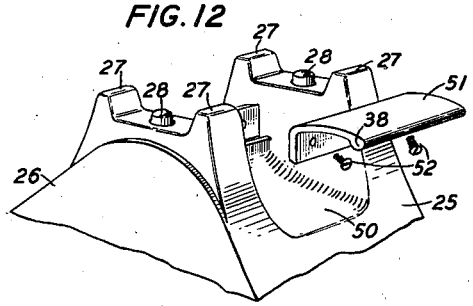
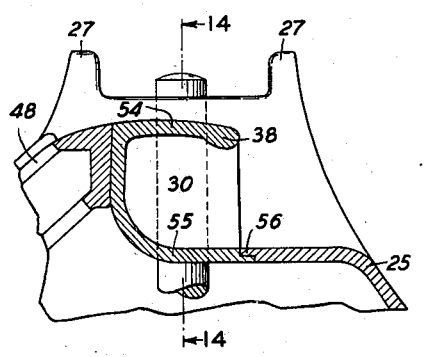
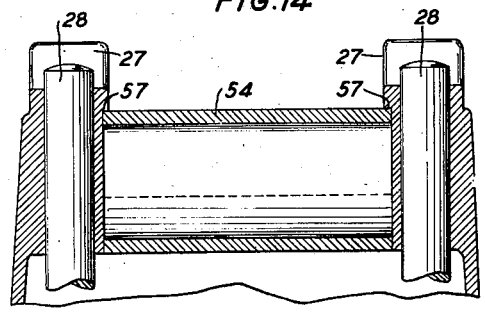
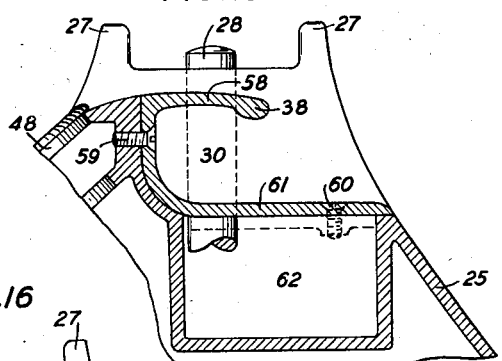
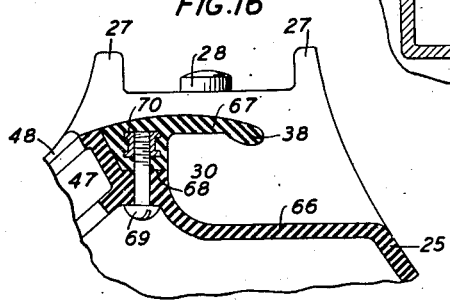
INVENTORS: J.J.KUHN
G.R.LUM
BY
Walter C. Kiesel
ATTORNEY Patented Oct. 19, 1937

2,096,046

UNITED STATES PATENT OFFICE 2,096,046

SUPPORT FOR TELEPHONES

John J. Kuhn, Elizabeth, N. J., and George R. Lum, New York, N. Y., assignors to Bell Telephone Laboratories, Incorporated, New York, N. Y., a corporation of New York Application March 27, 1935, Serial No. 13,236

5 Claims. (Cl. 179—179)

This invention relates to a support for a telephone or telephone hand-set and, more particularly, to a telephone mounting adapted to be supported on a planar surface or member.

An object of this invention is to improve the construction of mountings for telephone handsets.

Another object is to enable facile movement of a support for a telephone from place to place.

A feature of this invention comprises providing a mounting for a telephone hand-set with a portion easily engaged by the fingers of the hand whereby the mounting is easily lifted and moved from one spot to another.

A further feature comprises providing a mounting with such a portion in the immediate vicinity of the cradle portion thereof.

Still another feature comprises providing a mounting with such a portion at the rear of and under the cradle portion of the mounting.

A further feature comprises providing a hand telephone mounting with a fingers-recess defining portion that is removable from the mounting and is readily attached to or associated therewith.

Other and further features will be evident from the detailed description which follows hereinafter.

In accordance with this invention, a mounting for a telephone hand-set comprises a cradle portion to receive the hand-set, and a supporting portion for the cradle. The supporting portion comprises, preferably, a pedestal portion and a base portion. A recess, preferably elongated and rectangular in shape is provided in the supporting portion, more particularly, in the pedestal portion, at the rear of and under the cradle portion of the mounting. The recess, which is adapted to receive the fingers of the hand, is located immediately below the seat portion of the cradle portion, its uppermost defining surface being provided by the cradle seat portion.

A more complete understanding of this invention will be obtained from the detailed description which follows, taken in conjunction with the appended drawings, wherein:

Fig. 1 is a front elevational view of a mounting for a hand telephone embodying this invention;

Fig. 2 is a rear elevational view of the device of Fig. 1;

Fig. 3 is a plan view of the device of Fig. 1;

Fig. 4 is a perspective view of the device of Fig. 1;

Fig. 5 is a sectional view at an enlarged scale of the device of Figs. 1 to 4, taken along the line 5—5 of Fig. 3;

Fig. 6 is a sectional view of the device of Figs. 1 to 5, taken along the line 6—6 of Fig. 5;

Fig. 7 is a view at an enlarged scale of the device of Fig. 1 taken from below with the base plate removed;

Fig. 8 is a perspective view of a detachable portion of the device of Fig. 7, defining a portion of the fingers-recess in accordance with the invention;

Fig. 9 is a plan view of a mounting for a hand telephone embodying a modification of the invention;

Fig. 10 is a rear elevational view of the device of Fig. 9;

Fig. 11 is a sectional view at an enlarged scale of the device of Fig. 9 taken along the line 11—11 thereof;

Fig. 12 is an exploded view in perspective of a fragment of the device of Fig. 9;

Fig. 13 is a sectional view of a fragment of a mounting for a hand telephone, showing another modification of this invention;

Fig. 14 is a sectional view of the device of Fig. 13 taken along the line 14—14 thereof;

Fig. 15 is a sectional view of a fragment of a mounting for a hand telephone, showing still another modification of the invention;

Fig. 16 is a sectional view of a fragment of a mounting for a hand telephone, showing still another modification;

Fig. 17 is a rear view of a fragment of a mounting constituting a modification of the device of Figs. 1–8; and Fig. 18 is a sectional view of the mounting of Fig. 17 taken along the line 18—18 thereof.

The device of Figs. 1 to 8 comprises a support or desk mounting 20 for a hand telephone (not shown) comprising a base portion 21, a pedestal portion 22, and a cradle portion 23. The pedestal portion comprises a front, upwardly and inwardly sloping wall 24, a rear, upwardly and inwardly sloping wall 25, and substantially parallel, vertically upwardly extending walls 26 terminating in the cradle portion which is provided with two pairs of spaced tines 27, a cylindrical plunger member 28 being positioned mid-way between each pair of tines and extending into the hollow interior 29 of the mounting.

The pedestal portion contains a recess 30, adapted to receive the finger or fingers of the hand, in the rear wall 25 under the cradle portion. It is defined by the cradle portion 31 and a detachable, insertable plate member 40. The member 49 comprises an intermediate planar portion 32, end flange portions 33 and lug portions 34, supports the switch-spring assembly 35 for the mounting, is insertable through the base portion of the mounting, and is held in place by screws 36 that extend through the apertures 37 in the lugs 34 and thread into the mounting. The portion 31 is provided with a ridge portion 38 to insure a good purchase for the fingers, the flange portions of the member 49 being provided with correspondingly shaped grooves 39. As shown in Figs. 17 and 18, the portion 31 may be provided with a central, depending lip or extension 65, assisting in the positioning of the fingers along the undersurface of the portion 31 whereby the lifting force will be more uniformly distributed.

The mounting houses the switch-spring assembly and plunger members associated therewith, and a base plate 40 secured to the mounting by screws 41, provided with slip-over pads or members 42 of resilient material, and supporting the telephone instrumentalities ordinarily associated with the subscriber's substation, such as a ringer 43, a condenser 44, an induction coil 45, and a terminal block 46. The front wall 24 contains an aperture 47 to receive a calling dial (not shown) or an apparatus blank 48.

A mounting provided with a fingers-recess as described is easily and quickly lifted and moved from one place to another. A positive and definite grip on the structure is insured, obviating the possibility that the mounting, if otherwise grasped by the hand, will slip, and enabling the mounting to be supported easily regardless of the location of the gravitational center. The use, furthermore, of one hand only is required.

Figs. 9 to 12 disclose a modification of the invention. The recess 30 is defined by a wall portion 50 constituting an inwardly extending horizontal continuation of the rear wall 25, and a detachable substantially L-shaped member 51 insertable from the top of the mounting between the tines thereof and secured to the mounting by screws 52. The switch-spring assembly 35 is secured to the inner surface of the wall portion 50 by a screw 53.

Figs. 13 and 14 disclose another modification. The recess 30 is defined by a detachable substantially U-shaped member 54, insertable through the base portion of the mounting. A switch-spring assembly (not shown) may be supported on the undersurface of portion 55. Upward movement of the member 54 is limited by the shoulder portions 56, 57.

In the mounting of Fig. 15, the recess 30 is provided by U-shaped member 58 insertable between the tines and from the top of the mounting and held in position by screws 59, 60. One leg portion 61 of member 58 is elongated so as to form a closure for a depression or recess 62 in the mounting, the recess 62 being adapted to receive a switch-spring assembly (not shown) or other apparatus.

In Fig. 16, the recess 30 is provided by the inwardly extending, substantially horizontal portion 66 of the rear wall 25 and an attachable member 67, insertable between the pairs of tines 27, supported on the shoulder portion 68 of the mounting, and secured thereto by screws 69 threading into bushings 70 in the member 67, which like the rest of the mounting may be of molded insulating material.

While this invention has been disclosed in the reference to several specific embodiments thereof, it is to be understood that it is capable of other modifications, and is to be considered as limited, therefore, by the appended claims only.

What is claimed is:

1. A mounting for a hand telephone, comprising a base portion, a pedestal portion, and a cradle portion, said pedestal containing a recess for the fingers of the hand for lifting and carrying the mounting from place to place, said recess being defined by a portion of said pedestal portion and a stationary member inside of and attachable to said pedestal portion.

2. A mounting for a hand telephone, comprising a cradle portion having a cradle seat portion, a supporting portion having an open base portion, and a member insertable through the base of said supporting portion and constituting a portion of said cradle seat portion, said insertable member defining with said supporting portion a fingers-receiving recess extending inwardly from the rear of said supporting portion.

3. A mounting for a hand telephone comprising a base portion, a pedestal portion defined by a pair of upwardly and inwardly sloping surfaces and a pair of substantially vertically upwardly extending surfaces terminating in a cradle portion for the hand telephone, one of said sloping surfaces being adapted to receive and support a calling dial, and the other sloping surface containing a fingers-receiving recess extending inwardly under the cradle portion for rendering the mounting easily portable.

4. A support for a hand telephone comprising a pedestal portion and a cradle portion at the top thereof to receive the hand telephone, said pedestal portion having front and rear wall portions, one of said wall portions containing a fingers-receiving recess under said cradle portion and defined by spaced, substantially horizontal, stationary wall portions, and extending partially toward the other wall portion, whereby said mounting is liftable and readily carried on the fingers from one place to another.

5. A mounting for a hand telephone comprising a base portion, a pedestal portion, and a cradle portion to receive the hand telephone and comprising two pairs of spaced tines, said pedestal portion comprising an upwardly and inwardly extending front surface having a substantially horizontally rearwardly projecting extension between said pair of spaced tines, and an upwardly extending rear surface having a substantially horizontal wall portion extending oppositely to and beneath the rearwardly projecting extension and spaced therefrom to define a recess to receive the fingers of the hand whereby the mounting may be lifted upon insertion of the fingers and carried from one place to another.

JOHN J. KUHN.
GEORGE R. LUM.